US007996051B2

(12) United States Patent
Demuynck

(10) Patent No.: US 7,996,051 B2
(45) Date of Patent: Aug. 9, 2011

(54) WIRELESS COMMUNICATIONS DEVICE WITH HINGE

(75) Inventor: Randolph C. Demuynck, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 679 days.

(21) Appl. No.: 11/677,161

(22) Filed: Feb. 21, 2007

(65) Prior Publication Data
US 2008/0196202 A1 Aug. 21, 2008

(51) Int. Cl.
*H04M 1/00* (2006.01)
(52) U.S. Cl. ........... 455/575.3; 455/575.1; 455/575.4; 455/550.1; D14/331; D14/132; D14/138 AD; D14/138 AB
(58) Field of Classification Search .......... 455/575, 455/550, 575.1–575.4; D14/331, 132, 138 AD, D14/138 AB; 361/814, 679.39, 679.55, 679.56
See application file for complete search history.

(56) References Cited

U.S. PATENT DOCUMENTS

| 6,658,272 | B1 * | 12/2003 | Lenchik et al. | 455/575.1 |
| 2004/0121825 | A1 * | 6/2004 | Ma et al. | 455/575.4 |
| 2004/0127266 | A1 | 7/2004 | Aagaard et al. | |
| 2004/0137940 | A1 * | 7/2004 | Matsunami | 455/550.1 |
| 2004/0203532 | A1 * | 10/2004 | Mizuta | 455/90.3 |
| 2005/0124392 | A1 * | 6/2005 | Jeong | 455/575.1 |
| 2005/0243997 | A1 * | 11/2005 | Zou | 379/433.13 |
| 2005/0255897 | A1 * | 11/2005 | Lee et al. | 455/575.4 |
| 2008/0045279 | A1 * | 2/2008 | Ohki | 455/575.1 |

FOREIGN PATENT DOCUMENTS

JP 2006038777 2/2006

OTHER PUBLICATIONS

Website printout from: http://www.mobiledia.com/phones/images/lg/vx9400/vx9400-3.jpg.
PCT—International Search Report dated Nov. 6, 2008, for Application No. PCT/US2008/085212, Filed Nov. 20, 2007.

* cited by examiner

*Primary Examiner* — Jinsong Hu
*Assistant Examiner* — Dung Hong
(74) *Attorney, Agent, or Firm* — Coats & Bennett, P.L.L.C.

(57) ABSTRACT

A wireless communications device, such as a cellular telephone, includes first and second bodies having respective perimeters. A display is associated with one of the bodies and user input is associated with the other. A hinge mechanism moveably couples the bodies together so that the second body may pivot between a closed state and an open state. The second body, while in the open state, is slidable from a first open position to a second open position along the perimeter of the first body. The first and second bodies may have respective major axes, and the major axes may be substantially parallel when the second body is in the first open position. The major axes may advantageously also be substantially parallel when the second body is in the second open position. The bodies may include respective peripheral slots along which the hinge mechanism moves.

24 Claims, 5 Drawing Sheets

WIRELESS COMMUNICATIONS DEVICE WITH HINGE

BACKGROUND

The present invention relates generally to wireless communication devices having relatively moveable housing portions and, more particularly, to a hinge mechanism for connecting the relatively movable housing portions.

Wireless communications devices, such as cellular phones, personal digital assistants, and the like, frequently have two housing portions that are relatively moveable. For example, a common cell phone design is a so-called clamshell design, with a "flip" having a speaker and a display, and a base portion having a keypad and a microphone. The flip portion is connected to a base portion via a hinge. The flip portion rotates via the hinge between a closed position disposed proximate the base section in an overlying configuration and an open position where the flip and base are aligned end to end, similar to an open clamshell. The flip can typically be rotated open between about 90° and 180°, and sometimes more, relative to the base portion.

Wireless communications devices are rapidly adding functionality to the basic cell phone functionality. For example, many wireless communications devices can now be used for gaming, and/or for various business functions previously performed on office computers. For some of these additional functions, a traditional twelve-key phone keypad may be problematic, and a qwerty or similar keypad may be more desirable. Further, for many of these additional functions, a different screen orientation may be desired, such as one with a wider-than-tall orientation. Thus, as can be appreciated, while the conventional clamshell arrangement discussed above may be desirable when the device is used as a conventional cell phone, the conventional clamshell arrangement may be less desirable when the device is used for other purposes.

Therefore, while numerous wireless communications devices have been proposed, their configurations have not proven to be entirely satisfactory for some of the situations outlined above. Accordingly, there remains a need for alternative wireless communications device designs, advantageously ones that allow for a more user-friendly utilization of the device.

SUMMARY

In one illustrative embodiment, a wireless communications device, such as a cellular telephone, comprises a first body portion having a first perimeter and a second body portion having a second perimeter. A display is associated with one of the first and second body portions, and user input means is associated with the other. A hinge mechanism moveably couples the second body portion to the first body portion so that the second body portion may pivot between a closed state and an open state. The second body portion, while in the open state, is slidable from a first open position to a second open position along the first perimeter. The first and second open positions may be approximately 90° apart along the first perimeter. The first and second body portions may have respective major axes and the major axes may be disposed substantially parallel, and advantageously coincident, when the second body portion is in the first open position. Advantageously, the major axes may also be substantially parallel when the second body portion is in the second open position. The first and second perimeters may advantageously be substantially similar in shape, and advantageously generally oval. The operational orientation of the display may automatically change in response to the second body moving to the second open position.

In another embodiment, a wireless communications device comprises a first body portion having a first face and a longitudinal axis and a second body portion having a second face. A display is associated with one of the first and second body portions and user input means is associated with the other. A hinge mechanism moveably couples the second body portion to the first body portion so that the second body portion may pivot between a closed state and an open state relative to the first body portion. The second body portion, in the open state, is moveable relative to the first body portion such that a theoretical line from a midpoint of the first body portion along the longitudinal axis to a perimeter of the first body portion in a direction of the second body portion is variably oriented with respect to the longitudinal axis. The first body portion may include a first slot and the second body portion a second slot, with the hinge mechanism slidably disposed in the first and second slots. The hinge mechanism may comprise a first hinge plate associated with the first body portion and slidably mounted thereto and a second hinge plate associated with the second body portion and slidably mounted thereto.

In another embodiment, a wireless communications device comprises a first body portion; a second body portion distinct from the first body portion; and a display associated one of the first and second body portions and user input means associated with other. A hinge mechanism moveably couples the second body portion to the first body portion so that the second body portion may pivot between a closed state and an open state relative to the first body portion. The hinge mechanism comprises a first anchoring element associated with the first body portion and slidably mounted thereon for movement around a periphery thereof with the second body portion in the open state; a second anchoring element associated with the second body portion and slidably mounted thereon for movement around a periphery thereof with the second body portion in the open state; the first and second anchoring elements pivotally mated to one another for relative rotation about a pivot axis disposed generally tangent to a perimeter of the first body portion.

Other aspects of various embodiments of the inventive apparatus and related methods are also disclosed in the following description. The various aspects may be used alone or in any combination, as is desired.

DETAILED DESCRIPTION

Figure 1:
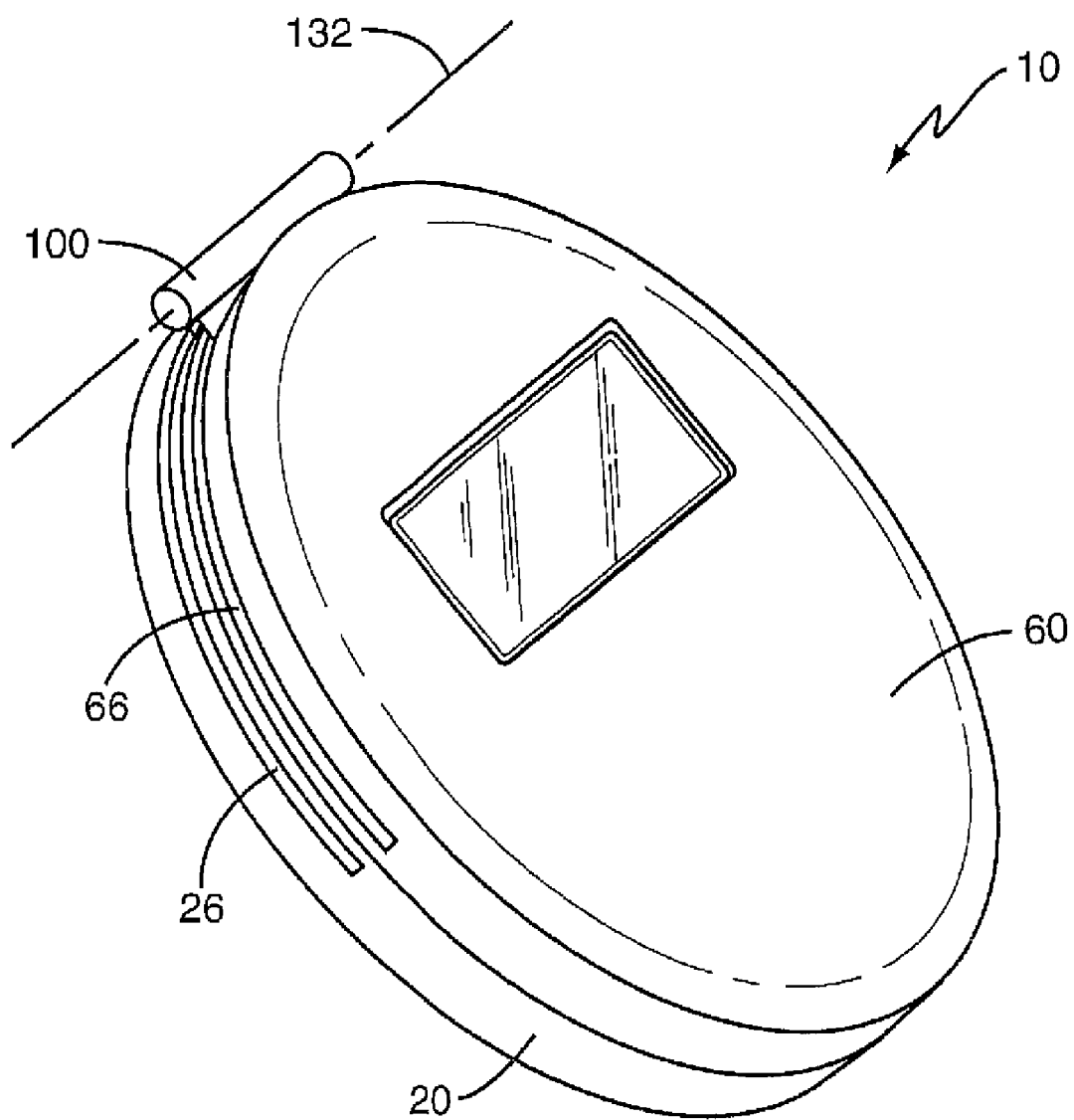
FIG. 1 shows a perspective view of one embodiment of a wireless communications device with its flip portion in the closed state.
Figure 2:
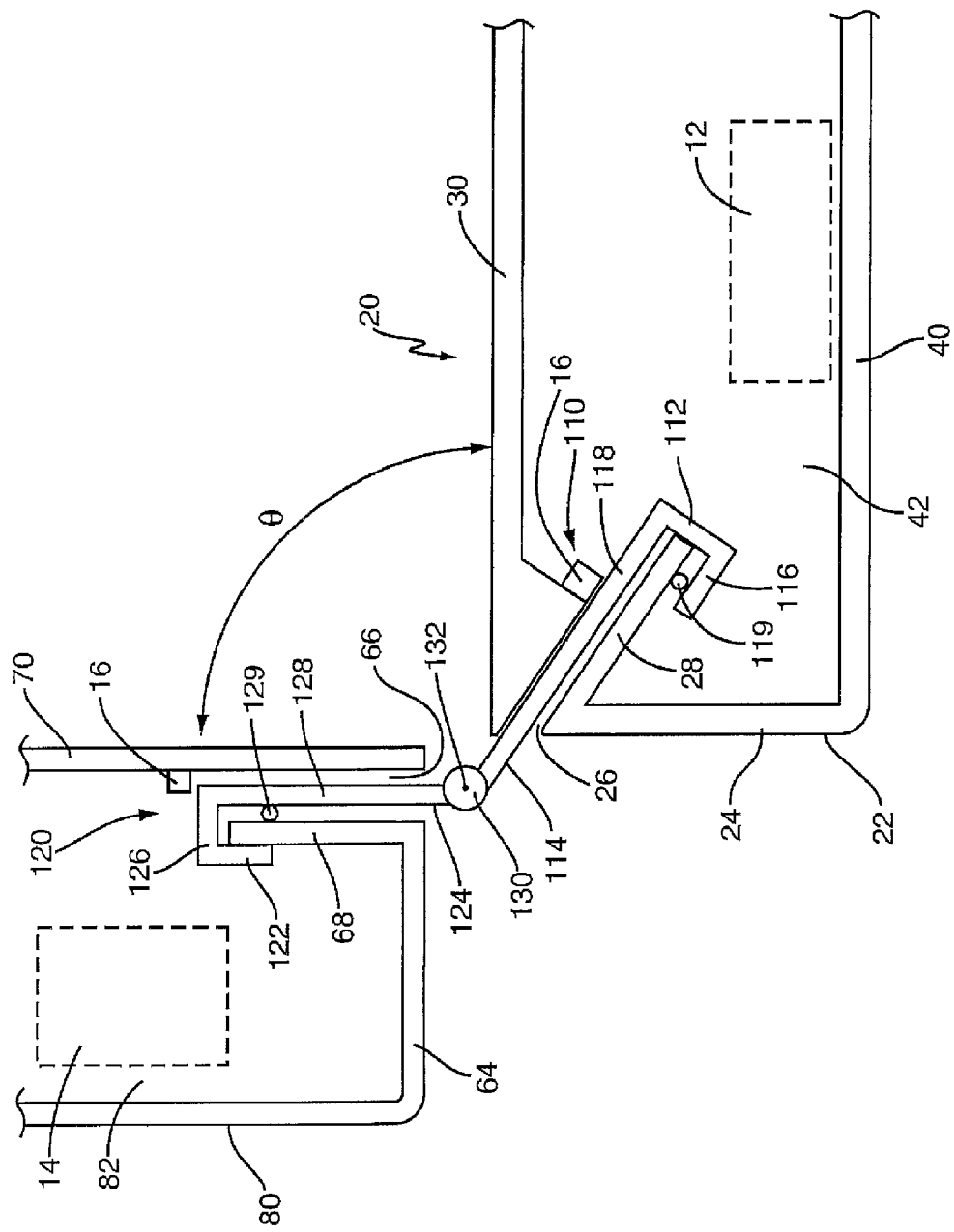
FIG. 2 shows a simplified cross-sectional side view of the wireless communications device of FIG. 1 with the flip portion in the open state.

One embodiment of a wireless communications device is shown in FIG. 1, and generally indicated at 10. The wireless communications device includes main base 20, a cover or "flip" portion 60, and a hinge mechanism 100. The base 20 includes a case or shell 22 that houses appropriate electronics, such as communications electronics 12. In general, the case 22 includes a top or face 30, a bottom 40, and a sidewall 24 interconnecting the two. The face 30 includes user input means, such as keypad 32, selection buttons 36, and/or microphone 34. While keypad 32 is shown as a conventional twelve-key keypad, the keypad 32 may take other forms known in the art, such as qwerty keypad. Further, while selection keys 36 are shown in an illustrative arrangement, other arrangements may alternatively be used. The bottom 40 is spaced from top 30 by sidewall 24 to form a cavity 42. The cavity 42 advantageously houses appropriate communications and control electronics 12, the details of which are not important to understanding the present invention. As can be seen in FIG. 2, the sidewall 24 includes a slot 26 that extends approximately 90° circumferentially around the perimeter 50 of case 22. A flange 28 defines the lower edge of slot 24, and top 30 helps define the upper edge of slot 24. As shown, the underside of top 30 may include a guide protrusion if desired. The overall shape of case 22 in this illustrative embodiment is generally oval (in front view), with a major or longitudinal axis 52 and a minor or transverse axis 54. For ease of reference, a midpoint 53 is located midway along major axis 52, and is considered the center of main base 20. Of course, the base 20 may take a shape other than oval, but a generally oval shape is believed advantageous for implementing the present invention.

The flip portion 60 likewise includes a case or shell 62 and advantageously has an overall shape (in front view) similar, or identical, to the main base 20. As such, the flip portion 60 likewise is generally oval, with a major or longitudinal axis 92 and a minor or transverse axis 94. As above, the center 93 of the flip portion's case 62 is defined as the midpoint of major axis 92. Of course, the flip portion 60 may take a shape other than oval, but a generally oval shape is believed advantageous for implementing the present invention. In general, the case 62 includes a face section 70, a top 80, and a sidewall 64 interconnecting the two. For case 62, the face section 72 is the portion of case 62 facing the main base 20 when the wireless communications device 10 is closed. The face section 70 includes output means, such as display 72 and/or speaker 74. The top 80 is spaced from face section 70 by sidewall 64 to form a cavity 82. The cavity 82 advantageously houses appropriate electronics 14, such as an antenna, communications electronics, and/or control electronics, or the like, the details of which are not important to understanding the present invention. As can be seen in FIG. 2, the sidewall 64 includes a slot 66 defined between face portion 70 and flange 68. The slot 66 advantageously extends approximately 90° circumferentially around the perimeter 90 of case 62.

The flip portion 60 is moveably coupled to the main base 20 by hinge mechanism 100. Hinge mechanism 100 includes a primary carriage assembly 110 pivotally coupled to a secondary carriage assembly 120. The primary carriage assembly 110 is associated with main base 20 and includes a hinge plate 112 with a flange 114 on one end, a hook portion 116 on the other end, and a central section 118 disposed therebetween. The central section 118 is disposed in slot 26, and flange 114 extends outward from slot 26. Hook portion 116 extends inwardly so as to wrap around flange 28 in order to maintain hinge plate 112 associated with main base 20. As can be seen in FIG. 2, flange 114 advantageously extends out from slot 26 at an upward angle. Primary carriage assembly 110 advantageously includes suitable means for reducing sliding friction between hinge plate 112 and case 22. For example, primary carriage assembly 110 may include one or more spheres 119 that rollingly support hinge plate 112 against flange 28. With such an arrangement, it may be advantageous for flange 28 to include some shallow detent recesses (not shown) that face hinge plate 112, so that primary carriage assembly 110 may be preferentially located in predetermined locations along slot 26 relative to perimeter 50.

The secondary carriage assembly 120 is associated with the flip portion 60 and includes a hinge plate 122 with a flange 124 on one end, a hook portion 126 on the other end, and a central section 128 disposed therebetween. The central section 128 is disposed in slot 66, and flange 124 extends outward from slot 66. Hook portion 126 extends inwardly so as to wrap around flange 68 in order to maintain hinge plate 122 associated with flip portion 60. Secondary carriage assembly 120 also advantageously includes suitable means for reducing sliding friction between hinge plate 122 and case 62. For example, sphere(s) 129 may form a rolling sphere(s) arrangement similar to that discussed above. Further, detents (not shown) may be used so that secondary carriage assembly 120 may be preferentially located in predetermined locations along slot 66 relative to perimeter 90 of case 62.

A hinge joint 130 connects hinge plate 112 to hinge plate 122 so that flip 60 may be opened and closed. The hinge joint 130 may take any suitable form known in the art, such as a dampened or detented hinge connection. The hinge joint 130 allows flip portion 60 to be moved between a closed state and an open state relative to main base 20 by rotation about pivot axis 132. In the closed state (FIG. 1), the flip portion 60 overlies the main base 20, such that face 70 faces face 30. In the open state (FIG. 2), flip portion 60 is rotated about hinge axis 132 so that a non-zero included angle Θ is formed between faces 30,70. This included angle Θ is advantageously in the range of 90°-180°.

As can be appreciated, primary carriage assembly 110 slides along slot 26 so as to be moveable along the perimeter 50 of main base 20. This sliding motion allows the flip portion 60 to be moved from a first position (FIG. 3) to a second position (FIG. 5) along perimeter 50, while flip portion 60 is in the open position, and advantageously while angle Θ is held constant. For example, the first perimeter position may correspond to a conventional flip-phone configuration (FIG. 3), where the major axis 92 of flip portion 60 is parallel to, or advantageously coincident with, the major axis 52 of main base 20. When positioned in this manner, there is a maximum distance between the speaker 74 and microphone 34, and the device 10 may be easily used as a conventional cell phone. The flip portion 60 may be moved relative to the main base 20 to a second position, such as one more suitable for gaming or business software functions. To do so, the primary carriage assembly 110 of hinge mechanism 100 is slid along slot 26, with the length of slot 26 helping determine the allowed amount of sliding. For example, if slot 26 extends for a 90° arc, then hinge mechanism 100 is limited to 90° of movement relative to the center 53 of main base 20. When moved as described, the major axis 92 of flip portion 60 is moved from being parallel to main base major axis 52 to being perpendicular thereto. Thus, the overall device would have a T-shape as depicted in FIG. 4. However, secondary carriage assembly 120 is also slidable along slot 66 so as to be moveable along the perimeter 90 of flip portion 60. Assuming that slot 66 also sweeps a 90° arc, the resulting dual sliding action allows flip portion 60 to be rotated into a new orientation so that the respective major axes 52,92 are again parallel, although not coincident. See FIG. 5. This arrangement is believed advantageous when using the device 10 for gaming or business applications.

Figure 3:
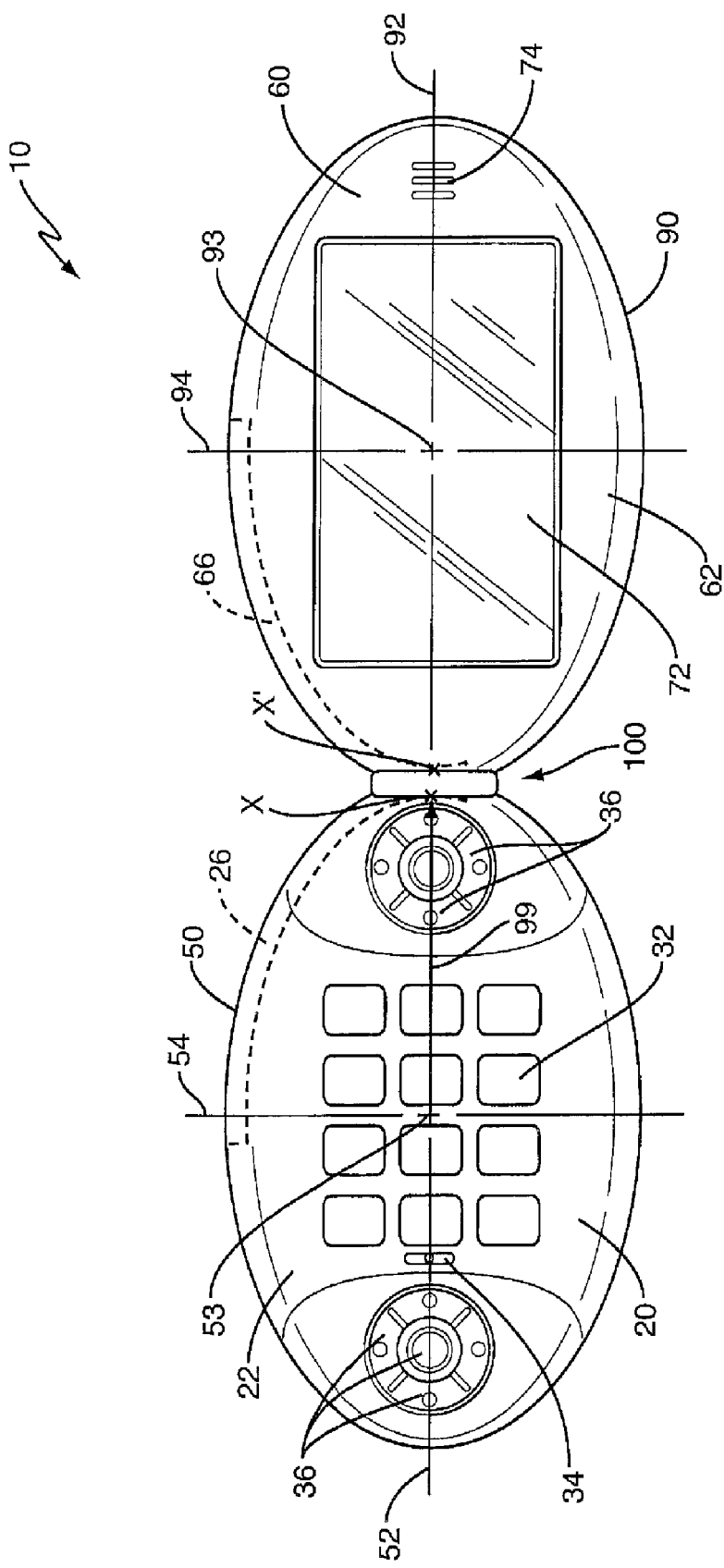
FIG. 3 shows the wireless communications device of FIG. 1 with the flip portion in the open state and positioned at a first location along the perimeter of main base.
Figure 4:
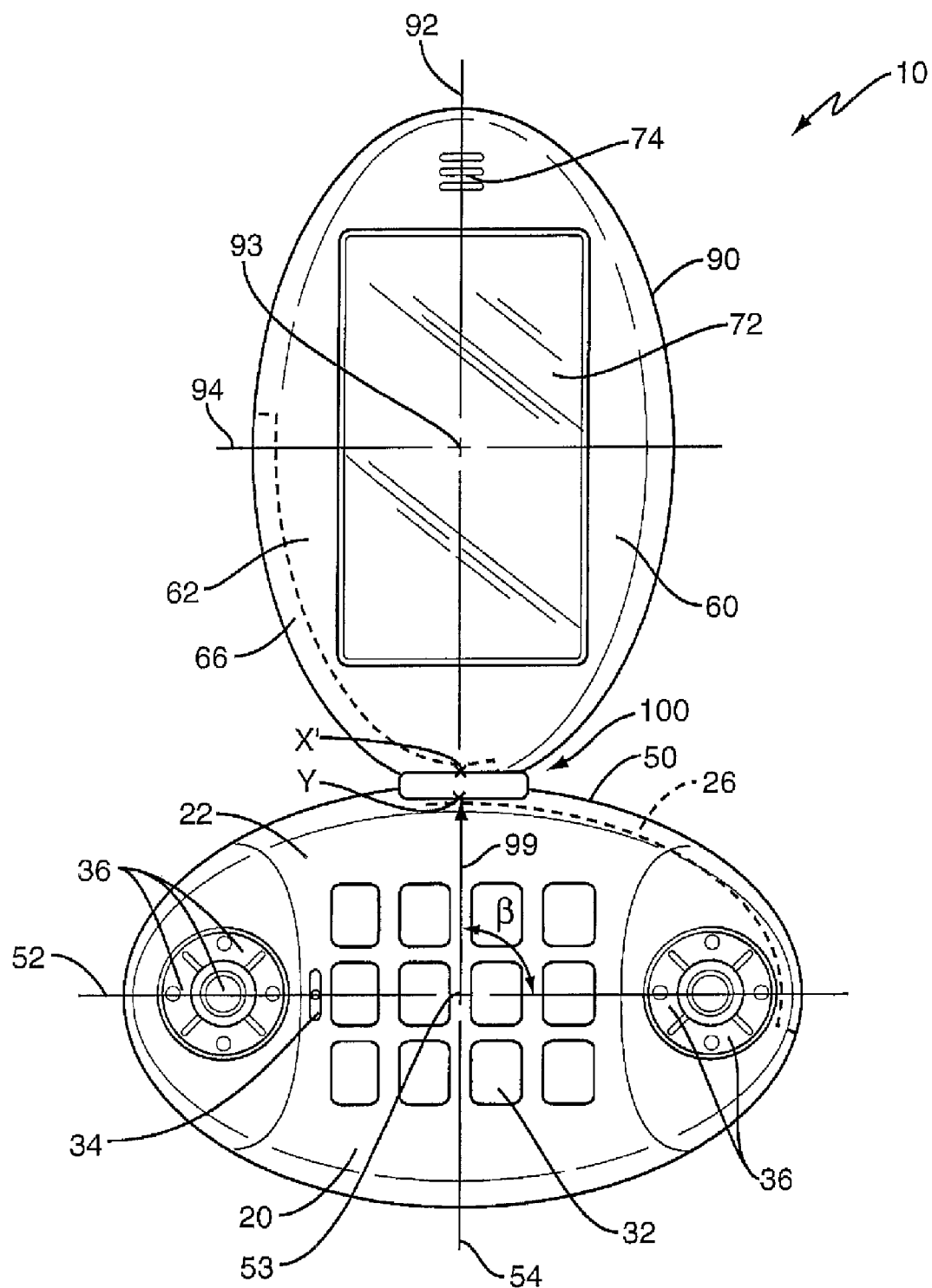
FIG. 4 shows the wireless communications device of FIG. 1 with the flip portion in the open state and positioned at a second location along the perimeter of main base.
Figure 5:
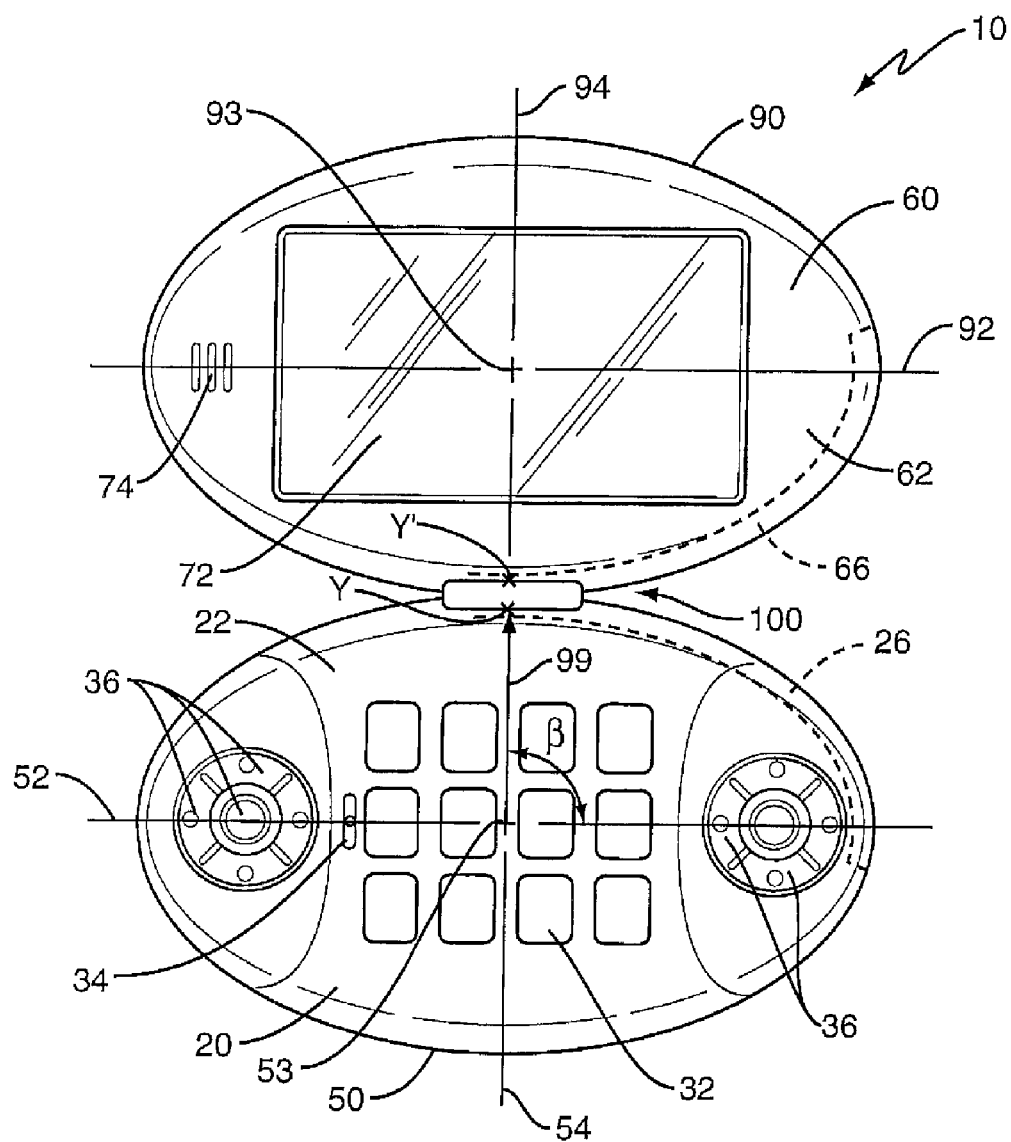
FIG. 5 shows the wireless communications device of FIG. 4 with the flip portion rotated to a new orientation.

As can be seen, the movement of the flip portion 60 from the position shown in FIG. 3 to the position shown in FIGS. 4-5 has the effect of changing the orientation of a theoretical line 99 extending from the center 53 of main base 20 to the closest point on the perimeter 90 of flip portion 60. This line 53 thus changes its relative angle β with respect to major axis 52 as the flip portion 60 is moved. Further, if the hinge mechanism 100 also slides along slot 66 in flip portion 60, then points of closest approach on the perimeter 50 of main base 20 and the perimeter 90 of flip portion 60 change from X and X' to Y and Y', respectively.

While the above description has been in terms of the device 10 changing configuration from the "in-line" configuration of FIG. 3, to the T-shaped configuration of FIG. 4, to the "side by side" configuration of FIG. 5, the transformation may be in the reverse sequence. Further, the flip portion 60 may simultaneously be moved relative to main base 20 and "spun" relative thereto, so that movement steps are combined and the interim T-shaped configuration of FIG. 4 is avoided.

In some embodiments, the main base 20 and/or flip portion 60 may include appropriate sensors 16 for detecting the relative orientations and positions of the components. And, based on these sensors 16, the wireless communications device 10 may change its operational mode. For example, with the wireless communications device 10 disposed as shown in FIG. 3, the control electronics may "orient" the display 72 "vertically" such that the point closest to speaker 74 is the functional "top" of the display 72; but when the wireless communications device 10 changes to the arrangement shown in FIG. 5, the control electronics may "orient" the display 72 "horizontally" so that the point closest to the speaker 74 is the functional "left" of display 72. Similarly, the function of the selection buttons 36 may change. Indeed, if the keypad 32 is of a touchscreen type, then the layout of keypad 32 may also be adapted based on the geometrical relationship between the flip portion 60 and the main base 20.

The discussion above has assumed that the cases 22,62 are generally oval in shape; however, such is not required in all embodiments. Instead, the cases 22,62 may have any suitable shape, including generally rectangular, or the like, as is desired.

Further, there are typically conductor based electrical connections between main base 20 and flip portion 60, such as for carrying display information to display 72, or audio output signals to speaker 74. As such, hinge mechanism 100 may advantageously include appropriate contact rings and contacts (not shown), or other means, to allow electrical connections to be maintained despite the changing relative positions and orientations of main base 20 and flip portion 60. And, any known approach, such as ribbon cabling, may be used to extend the desired electrical path(s) to and/or through hinge mechanism 100 from the electronics 12,14. If ribbon cable or the like is used, then care should be taken so that sufficient length of cabling is provided so as to not impede the desired movements of the hinge mechanism 100.

The present invention may be carried out in other specific ways than those herein set forth without departing from the scope and essential characteristics of the invention. Further, the various aspects of the disclosed device and method may be used alone or in any combination, as is desired. The disclosed embodiments are, therefore, to be considered in all respects as illustrative and not restrictive, and all changes coming within the meaning and equivalency range of the appended claims are intended to be embraced therein.

What is claimed is:

1. A wireless communications device, comprising:
    a first body portion having a first perimeter and including a first slot that extends approximately 90° circumferentially around the first perimeter;
    a second body portion having a second perimeter and including a second slot that extends approximately 90° circumferentially around the second perimeter;
    a display associated with at least one of said first and second body portions and user input means associated with at least the other of said first and second body portions; and
    a hinge mechanism moveably coupling said second body portion to said first body portion so that said second body portion may pivot between a closed state and an open state;
    wherein said hinge mechanism is slidably disposed in said first and second slots, and correspondingly slidable within the first slot along the first perimeter of the first body portion and within the second slot along the second perimeter of the second body portion.

2. The wireless communications device of claim 1 wherein said second body portion, while in said open state, is slidable from a first open position to a second open position along said first perimeter, and wherein said first and second open positions are approximately 90° apart along said first perimeter and said second perimeter.

3. The wireless communications device of claim 1 wherein said second body portion, while in said open state, is slidable from a first open position to a second open position along said first perimeter, wherein said first body portion has a first major axis and a first minor axis, and wherein said second body portion has a second major axis and a second minor axis; wherein said second major axis is disposed substantially parallel to said first major axis when said second body portion is in said first open position.

4. The wireless communications device of claim 3 wherein said second major axis is disposed substantially parallel to said first major axis when said second body portion is in said second open position.

5. The wireless communications device of claim 1 wherein said first and second perimeters are substantially similar in shape.

6. The wireless communications device of claim 1 wherein said first and second perimeters are generally oval.

7. The wireless communications device of claim 1 wherein said second body portion, while in said open state, is slidable from a first open position to a second open position along said first perimeter, and wherein points of closest approach between said first body portion and second body portion are different with said second body portion in said first open position than in said second open position.

8. The wireless communications device of claim 1 wherein said second body portion, while in said open state, is slidable from a first open position to a second open position along said first perimeter, and wherein an operational orientation of said display automatically changes in response to said second body moving to said second open position.

9. The wireless communications device of claim 1 wherein said hinge mechanism comprises a first hinge plate associated with said first body portion and slidably disposed in said first slot and a second hinge plate associated with said second body and slidably disposed in said second slot.

10. The wireless communications device of claim 1:
    wherein said second body portion, while in said open state, is slidable from a first open position to a second open position along said first perimeter;

wherein said hinge mechanism comprises a first hinge plate associated with said first body portion and slidably disposed in said first slot and a second hinge plate associated with said second body and slidably disposed in said second slot;

wherein said first and second open positions are approximately 90° apart along said first perimeter;

wherein said first body portion has a first major axis and a first minor axis, and wherein said second body portion has a second major axis and a second minor axis;

wherein said second major axis is disposed substantially parallel to said first major axis when said second body portion is in said first open position; wherein said second major axis is disposed substantially parallel to said first major axis when said second body portion is in said second open position;

wherein points of closest approach between said first body portion and second body portion are different with said second body portion in said first open position than in said second open position; and wherein an operational orientation of said display automatically changes based on said second body portion being in said first open position or in said second open position.

11. The wireless communications device of claim 1 wherein said first and second perimeters are generally curved, and wherein at least one of said first and second body portions simultaneously rotate and slide while the hinge mechanism slides along at least one of the respective first and second perimeters.

12. The wireless communications device of claim 1 wherein said display is associated with said second body portion, and wherein said user input means is associated with said first body portion.

13. A wireless communications device, comprising:
a first body portion having a first face and a longitudinal axis;
a second body portion having a second face;
a display associated with at least one of said first and second body portions and user input means associated with at least the other of said first and second body portions; and
a hinge mechanism moveably coupling said second body portion to said first body portion so that said second body portion may pivot between a closed state and an open state relative to said first body portion;
wherein said second body portion, in said open state, is moveable relative to said first body portion such that a theoretical line from a midpoint of said first body portion along said longitudinal axis to a perimeter of said first body portion in a direction of said second body portion is variably oriented with respect to said longitudinal axis, and
wherein said first body portion includes a first slot that extends approximately 90° circumferentially around a perimeter of the first body portion, wherein said second body portion includes a second slot that extends approximately 90° circumferentially around a perimeter of the second body portion, and wherein said hinge mechanism is slidably disposed in said first and second slots.

14. The wireless communications device of claim 13 wherein the first and second faces form an included non-zero angle therebetween in said open state; and wherein said theoretical line is variably oriented with respect to said longitudinal axis with said angle between said first and second faces held substantially constant.

15. The wireless communications device of claim 13 wherein said theoretical line may vary its orientation with respect to said longitudinal axis by approximately 90° or more.

16. The wireless communications device of claim 13 wherein said second body portion is movable relative to said hinge mechanism such that a point of closest approach to said first body portion proximate said hinge mechanism is variable.

17. The wireless communications device of claim 13:
wherein said first body portion has a first major axis and a first minor axis;
wherein said second body portion has a second major axis and a second minor axis;
wherein said second major axis is disposable parallel to said first major axis both when said theoretical line is parallel to said first major axis and when said theoretical line is perpendicular to said first major axis.

18. The wireless communications device of claim 13 wherein said hinge mechanism comprises a first hinge plate associated with said first body portion and slidably mounted in said first slot and a second hinge plate associated with said second body portion and slidably mounted in said-second slot.

19. A wireless communications device, comprising:
a first body portion including a first slot that that extends approximately 90° circumferentially around a periphery of the first body portion;
a second body portion distinct from said first body portion and including a second slot that extends approximately 90° circumferentially around a periphery of the second body portion;
a display associated with at least one of said first and second body portions and user input means associated with at least the other of said first and second body portions;
a hinge mechanism moveably coupling said second body portion to said first body portion so that said second body portion may pivot between a closed state and an open state relative to said first body portion;
said hinge mechanism comprising:
a first anchoring element associated with said first body portion and slidably disposed in said first slot for movement around the periphery of the first body portion with said second body portion in said open state;
a second anchoring element associated with said second body portion and slidably disposed in said second slot for movement around the periphery of the second body portion with said second body portion in said open state;
said first and second anchoring elements pivotally mated to one another for relative rotation about a pivot axis disposed generally tangent to a perimeter of said first body portion.

20. The wireless communications device of claim 19 wherein said first anchoring element slidingly engages said first body portion for sliding movement through an arc of approximately 90° with respect thereto.

21. The wireless communications device of claim 19 wherein said second body portion, while in said open state, is moveable relative to said first body portion from a first position to a second position; wherein said first body portion has a first major axis and a first minor axis, and wherein said second body portion has a second major axis and a second minor axis; wherein said second major axis is disposed substantially parallel to said first major axis when said second body portion is in said first position.

22. The wireless communications device of claim 21 wherein said second major axis is disposed substantially parallel to, but non-coincident with, said first major axis when said second body portion is in said second position.

23. The wireless communications device of claim 21 wherein an operational orientation of said display automatically changes in response to said second body moving to said second open position.

24. The wireless communications device of claim 19 wherein the peripheries of said first and second body portions are generally curved, and wherein at least one of said first and second body portions simultaneously rotate and slide while at least one of the respective first and second anchoring elements move around at least one of the peripheries of the respective first and second body portions.

* * * * *